United States Patent [19]

Chestnut et al.

[11] Patent Number: 4,514,307
[45] Date of Patent: Apr. 30, 1985

[54] METHOD OF STABILIZING ORGANIC WASTE

[75] Inventors: Raymond Chestnut, Ridley Park; John J. Colussi, Norristown; Donald J. Frost, Chalfont; William E. Keen, Jr., Flourtown; Margaret C. Raduta, Riegelsville, all of Pa.

[73] Assignee: Conversion Systems, Inc., Horsham, Pa.

[21] Appl. No.: 517,753

[22] Filed: Jul. 26, 1983

[51] Int. Cl.³ .......................... C02F 11/14; C04B 1/00
[52] U.S. Cl. ................................ 210/751; 106/119; 106/DIG. 1; 210/908
[58] Field of Search ................. 106/119, DIG. 1, 120; 210/609, 723, 724, 751, 908; 405/129, 263, 264

[56] References Cited

U.S. PATENT DOCUMENTS

| | | | |
|---|---|---|---|
| Re. 29,783 | 9/1978 | Smith et al. | 210/751 |
| 3,206,319 | 9/1965 | Minnick et al. | 106/119 |
| 3,720,609 | 3/1973 | Smith et al. | 210/751 |
| 3,841,102 | 10/1974 | Cinner | 210/170 |
| 3,870,535 | 3/1975 | Minnick et al. | 106/118 |
| 3,947,284 | 3/1976 | Kitsugi et al. | 106/89 |
| 3,980,558 | 9/1976 | Thompson | 210/751 |
| 4,028,130 | 6/1977 | Webster et al. | 210/751 |
| 4,116,705 | 9/1978 | Chappell | 210/751 |
| 4,149,968 | 4/1979 | Kupiec et al. | 405/128 |
| 4,209,335 | 6/1980 | Katayama et al. | 106/89 |
| 4,230,568 | 10/1980 | Chappell | 210/751 |
| 4,274,880 | 6/1981 | Chappell | 106/DIG. 1 |

FOREIGN PATENT DOCUMENTS

1485625  9/1977  United Kingdom .

*Primary Examiner*—Peter Hruskoci
*Attorney, Agent, or Firm*—Ratner & Prestia

[57] ABSTRACT

Method for disposing of (or converting to a construction material) physically unstable wastes comprised of non-biologic, organic, water insoluble compounds, usually dispersed in water, by incorporation thereof in a lime-fly ash water mixture which hardens under atmospheric conditions to form an environmentally acceptable, impermeable, load-bearing material.

10 Claims, No Drawings

METHOD OF STABILIZING ORGANIC WASTE

BACKGROUND OF THE INVENTION

This invention pertains to a method of disposing of certain non-biologic organic waste material in an environmentally acceptable manner. More particularly, it pertains to a method of converting such material to a substantially impermeable, load-bearing construction material.

Society's increasing concern with the environmentally safe disposal of industrial wastes has led to the development of a variety of processes in which said wastes are incorporated in, or encapsulated in, a cementitious material. Upon hardening, such material is suitable for use as a construction or landfill material.

The adaptability of such processes to the disposal of a wide variety of waste materials, including organic waste materials, is suggested, for example, in British Pat. No. 1,485,625—Chappell and U.S. Pat. Nos. 3,947,284—Kitsugi et al, 3,980,558—Thompson, and 4,209,335—Katayama et al. The teachings of these references are directed primarily to the utilization of Portland cement as the encapsulation material. The terms used however are not necessarily consistent. The British Chappell patent, for example, describes the cement as: "calcium-containing cements . . . for example, those complying with British Standards 12 (1958), 4027 (1966), 4248 (1968), 146 (1968), 4246 (1968), 1370 (1958) or 915 (1947)" (Page 2, Column 2, lines 66–70), combined with an aluminosilicate, typically fly ash.

Waste incorporatable in this matrix according to Chappell are said to include "paint wastes," "printing and duplicating wastes," "explosives industry wastes excluding organic wastes produced by this industry," "Latex wastes and cyanide, mercury and zinc wastes produced by the rubber and plastics industry," "textile wastes," "pulp and paper industry wastes," "leather industry wastes," and "sewage sludges" (Page 2, Column 2, lines 5–56). The examples in the Chappell patent refer to an oily waste comprising 2 percent mineral oil and 94 percent water (Example 8), a latex waste produced by the upholstery industry and comprised of 12 percent organic, 1 percent inorganic, and 87 percent water (Example 11), and digested sewage sludge (Example 14). Portland cement is used in each of these examples.

Kitsugi et al teaches that certain waste sludges may be rendered amenable for incorporation in a Portland cement mix by the further inclusion of an alkali or calcium sulfate compound. The waste thus treated is one having a high water to solid ratio and containing a substance having "a harmful effect on the setting of normal portland cement . . . , for example an organic substance . . . sugar, a cracked petroleum substance, a fat and a humic substance . . . and an organic phosphorus compound such as parathion" (Column 1, lines 7–35).

Katayama et al also discloses that waste sludges, referred to there as "Hedro," may be disposed of by a mixture with hydraulic cement. The Katayama et al patent indicates the cement used is preferably "portland cement, but it is as well possible to use portland blast-furnace cement, silica cement, fly ash cement, pozzolan cement, etc." (Column 2, line 68 to Column 3, line 3). The Hedro is said often to include substances which hamper or inhibit hydraulic cement from hardening, such as "saccharides, humins, tannins, fats and fatty oils, humuses, [etc.]" (Column 1, lines 44–48). Katayama refers to a so-called synergistic effects resulting from the use of an additive to permit the hydraulic cement to set up even in the presence of these harmful or cement inhibiting compounds. The additives consist generally of a sulfate, together with a carbonate, bicarbonate, or silicate, and may further include a hydroxide or oxide of an alkali earth metal (Column 3, lines 3–24).

Katayama's Example 1 pertains to solidifying, with Portland cement, the effluent sludge of a food processing plant containing considerable organic matter [which is said to hamper hydraulic cement from hardening by hydration], such as saccharides or the like (Column 1, lines 45–48). The sludge was comprised of 91% water and exhibited a weight reduction upon heating, for 30 minutes at 800° C., of 70 percent. Use of the cement in a proportion of up to 30 percent, without the additive, failed to produce a hardenable mixture. The addition of 10 percent calcium hydroxide, however, resulted in hardening of the mixture and this enhancement was even greater with the further addition of aluminum sulfate and sodium carbonate, along with some reduction of the calcium hydroxide.

A fly ash cement, presumably Portland cement combined with fly ash, is utilized in Example 5, without the additives, and is demonstrated apparently to produce an unsatisfactory hardening in combination with a waste consisting of electrostatic precipitator dust from a community incinerator. PCB-contaminated Hedro (1,000 PPM PCB) is solidified, according to Example 7, utilizing Portland cement. The remaining examples are similar, that is, Portland cement is used in each case in which the waste includes any organic material, even as a contaminent.

Thompson similarly discloses a process for disposing of liquid or semi-liquid wastes containing soluble toxic material by admixing the waste with a solidifying agent consisting essentially of a hydraulic cement in an amount sufficient to provide a fluid mass which will set upon standing to a contiguous rock-like solid consistency. According to the Thompson patent, it has been unexpectedly found that the liquid or semi-liquid wastes must be admixed with the hydraulic cement in an amount of at least 9 pounds hydraulic cement per gallon of waste containing from about 30 to about 40 volume percent solids to provide an admixture which will be sufficiently fluid yet will set to a contiguous rock-like solid consistency of sufficient strength and non-porosity to entrap the soluble toxic materials in the waste to prevent leaching (Column 2, lines 68 to Column 3, line 7). Even then, the mixture is preferably poured into a subsurface soil pit lined with a moisture impervious film prior to setting and is subsequently covered with a layer of soil. While the process is said to be particularly useful in disposing of liquid sludge waste from chemical processes for the manufacture of phosphoric acids, particularly aqueous filter aid sludges (and it is this specific sludge which is addressed in each of the examples), the Thompson patent otherwise suggests that the process is useful with "substantially any type of liquid or semi-liquid waste containing soluble toxic materials" (Column 4, lines 53 and 54). Moreover, the "hydraulic cement" useful in this process is said to "include all mixtures of lime, silica and alumina, or of lime and magnesia; silica, alumina, and iron oxide and other like mixtures of ingredients which set upon the action of water to a contiguous rock-like solid consistency [including] hydraulic limes, grappier cement, puzzolan cements, and Portland cements" (Column 3, lines 52–59).

While the foregoing references seem to suggest that the applicability of their teachings extend to disposal processes and compositions involving cementitious material other than Portland cement, these suggestions are tenuous at best. The extension of these teachings to a cementitious material or system comprised of lime and fly ash is even more speculative, particularly in the context of a waste or disposal of a waste with known cement-inhibiting characteristics such as one which is predominantly organic in character.

In contrast to the cementitious reaction of Portland cement, in which lime or calcium hydroxide is produced, fly ash (primarily the collected stack dust from a pulverized coal burning combustion unit) is a pozzolan which forms cementitious products through the consumption of lime. Moreover, the speed of reaction in these systems is quite different. Portland cement sets to approximately 50 percent of its strength within 24 hours. In contrast, significant strength and impermeability is not generally developed in a lime-fly ash system before about 7 days and 50 percent of ultimate strength is generally not achieved until about 30 days. These characteristic features are believed to be only the more readily discernable indications of the significantly different chemistry in a lime-fly ash cementitious system as compared with a Portland cement system.

Because of the ready availability of fly ash as a waste material (it is considered by some to be an environmental hazard in itself), fly ash is a highly practical constituent for disposal processes, by which other wastes may be incorporated in an environmentally acceptable cementitious matrix. And indeed that factor had led to the fairly widespread use of lime-fly ash disposal processes as exemplified, for example, by the POZ-O-TEC® process commercialized by Conversion Systems Inc., the assignee of the present invention, for the disposal of sulfite-containing flue gas desulfurization sludges. Lime-fly ash cementitious compositions have also been found useful for the disposal of characteristically inorganic industrial waste sludges, particularly those including sulfate compounds (as disclosed and claimed in U.S. Pat. No. Re. 29,783—Smith et al), for coal mining refuse (as disclosed and claimed in U.S. Pat. No. 3,870,535—Minnick et al), and for digested sewage sludge (as disclosed in U.S. Pat. No. 4,028,130—Webster et al), all of common assignment herewith.

Of further background interest is U.S. Pat. No. 3,206,319—Minnick et al which discloses a road base composition comprised substantially of aggregate and incorporating a cementitious matrix comprised of lime-fly ash and bitumen. In general "bitumen," which is self-setting, is emulsified asphalt or an asphalt from which petroleum distillate-soluble components have been removed.

Further, it is known that in certain commercial operations preceding the present invention, small amounts of organic materials (primarily oils and greases) have been included in limited amounts (on the order of 2–5 percent) in other industrial waste, which has been treated and disposed of by the incorporation of the waste in a lime-fly ash cementitious matrix.

Notwithstanding this background, there remains a pressing need for a process for the disposal of a wide variety of non-biologic, organic wastes in an economic and environmentally acceptable manner. As used herein, the term "organic waste," unless otherwise indicated, refers to a physically unstable (i.e., nonload-bearing and penetrable) by-product of a commercial process, the chemical constituents of which, other than water, are predominantly, or at least characteristically, organic in nature. "Non-biologic" indicates that the organic character of the waste is due to the inclusion of organic compounds other than proteins, carbohydrates, and like compounds typically of direct biologic origin.

Disposal of such wastes in a lime-fly ash cementitious matrix has not heretofore been considered acceptable. This is thought to be due to the widespread understanding that organic materials generally inhibit or interfere with cementitious reactions and may be tolerated in substantial amounts in such reactions only within specific limitations as to reaction-enhancing additives, amounts, or characteristic types of organics, (e.g., digested sewage sludge).

This understanding is further evidenced by express regulatory directives which indicate, for example, "[lime-fly ash] techniques are generally better suited for stabilizing inorganic wastes rather than organic wastes. The decomposition of organic material in the sludge mass after curing can result in increased permeability along with some decrease in the strength of the material." Among the disadvantages of such techniques are listed "stabilized sludges are vulnerable to acidic solutions and to curing and setting problems associated with inorganic (sic) contaminants in the waste sludge (Page 16, Toxic and Hazardous Waste Disposal, Vol. 1, "Processes for Stabilization/Solidification," edited by Robert B. Pojasek, Ann Arbor Science Publishers, Inc., 1979). On Page 21 of the same text in Table 2 under the fixation system identified as "lime-based" (otherwise identified to comprise lime-fly ash systems), the column entitled "Materials to Which System is Not Applied" lists "organic wastes, toxic anions."

It is, therefore, the general object of the present invention to provide a method of disposing of at least certain types of organic waste materials by the incorporation thereof, in substantial amounts, in a practical and economical cementitious matrix material.

A further object of this invention is to provide a method for converting selected physically unstable organic wastes to a load-bearing and substantially impermeable construction material of reduced leachability and thus to permit use or disposal of the waste in a practical and environmentally acceptable manner.

BRIEF DESCRIPTION OF THE INVENTION

Briefly, the present invention comprises a process for the disposal of selected organic wastes, namely physically unstable wastes comprised of water insoluble, non-biological organic compounds, usually dispersed in water. The waste material is combined with cementitious reactants consisting essentially of lime and fly ash, in the presence of water, to form a mixture in which the relative proportions of the waste material, lime, fly ash, and water are adapted to permit the lime and fly ash to react at atmospheric conditions and thus to form a cementitious matrix in which the waste material is encapsulated. This permits its disposal, or use as a construction material, in an environmentally acceptable manner.

More specifically, the waste material is selected so as to exclude, in any substantial amount, organic materials which dissociate or dissolve in water, and also to exclude organic materials of direct biologic origin which are comprised generally of substantial amounts of protein and carbohydrates.

In general, the non-water portion of the waste material comprises at least 20 percent (on a net weight basis for the total mix) by weight water insoluble, non-biologic organic compounds. Preferably, the organic waste compounds comprise 20-50 percent of the mix.

Preferably also, the present invention is adapted to the conversion and disposal of particular forms of organic wastes, namely coke tar and petroleum refinery sludge, waste emulsion from acrylic and latex manufacturing operations, and insecticide, pesticide, and decommissioned nerve gas waste emulsions. In each case, the non-solid portion of the waste is substantially all water, much of which is retained in the waste indefinitely even though the organic materials are water insoluble.

DETAILED DESCRIPTION OF THE INVENTION

In essence, the present invention is directed to disposal methods which utilize the lime-fly ash reaction mechanism to cementitiously encapsulate, and thus to stabilize, physically unstable industrial wastes containing significant concentrations of certain types of organic compounds; to form of those materials a substantially monolithic, impermeable load-bearing material suitable, among other things, for landfill disposal. The selected organic wastes with which the present invention is useful are generally referred to as insoluble, non-biologic organic-containing waste material, that is waste material comprised of at least 20 percent by weight, in its non-water portion, of such organic compounds. The term organic as used herein refers to any compound which contains the element carbon with the notable exceptions of specific compounds clearly recognized to be inorganic, namely carbon monoxide, carbon dioxide, carbides, carbon disulfide, and metallic carbonates.

The non-water portion of wastes of interest in all cases is characteristically organic. The term "non-biologic" is intended to exclude water streams such as sewage sludge and food processing wastes, which contain substantial concentrations of proteins and carbohydrates, as well as microorganisms, all of which are thought to interact with the lime-fly ash system in a manner differently than the organic compounds addressed in the present invention.

Also specifically excluded from wastes with which the present invention may be used are wastes containing any substantial amount of organic compounds which are soluble or dissociable in water. Such compounds may interfere with or modify the ionic interaction necessary for the cementitious reaction in the present invention, or otherwise leave undue amounts of residual organics susceptible to leaching upon water permeation of the disposal mass.

The remaining organic compounds, and waste containing those compounds, which may be disposed of in accordance with the present invention, include in general water-insoluble substituted and non-substituted aliphatic and aromatic compounds resulting from chemical and petrochemical manufacturing, processing, and disposal operations. Included specifically are coke and petroleum refinery waste tars, latex, and acrylic emulsions, pesticides, and decommissioned nerve gas wastes.

Industrial wastes often contain relatively high concentrations of organic materials which render the wastes incompatible with direct landfilling or end product reuse, due to the potential for pollutant migration into the environment. More importantly, the wastes with which the present invention is useful are those in which the organic constituent tends to permanently bind or contain water. The inability of these materials to separate easily from water is the characteristic which is common to the waste disposal processes disclosed and claimed herein. These waste materials will remain indefinitely as a wet waste unless converted, as in the present invention. Generally such wastes are considered physically unstable, that is they are nonload-bearing and easily penetrable.

It has been successfully demonstrated that through the process of the present invention, specific organic industrial wastes, which are physically unstable, can be solidified into a structurally, physically, and chemically stable, environmentally acceptable material, suitable for landfilling.

In accordance with the present invention, the waste is treated by combination therewith of lime and fly ash.

Fly ash, per se, is normally considered to be the finely divided ash normally separated from the stack gases in a pulverized coal-burning combustion unit. However, for purposes of the present invention, any fly ash or waste residue which meets the requirements for a class N, C, or F pozzolan as defined in ASTM (American Society for Testing Materials) Standard C618-80 may be used in the present invention as fly ash. This includes particularly, lignite, subbituminous and bituminous fly ashes, alumino-siliceous and siliceous dusts from air pollution control equipment, electric furnace dust resulting from the steel industry, lime kiln dusts from coal fired lime kilns, and dry scrubber residues. To determine that any one of these materials in a given application and from a given source is interchangeable and may be used as fly ash in accordance with the present invention, the material must be tested in accordance with ASTM C593-76A and when tested in accordance with that specification must develop sufficient strength within a reasonable period of time, for example 250 psi minimum after 7 days at 130° F. Preferably, the reactivity is such that the pozzolanic test yields a strength of 600 psi after 7 days at 130° F. The more reactive the fly ash, of course, the less may be necessary (or alternatively lower lime dosage may be used) in formulating an environmentally acceptable disposal composition from any given waste.

The second necessary reactant in the process of the present invention is lime. This may be any high calcium, dolomitic, or magnesian quicklime or hydrated lime as described in ASTM C51. Certain waste materials, such a lime kiln residue, having available calcium hydroxide, for example, may also be used in place of lime. Generally, the proportion of lime or lime equivalent is based on weight percent calcium oxide or equivalent thereof as determined by ASTM C-25.

In the disposal or conversion method of the present invention, the reactant materials mentioned above are preblended and/or blended in a mixing apparatus with the water-bearing waste material. The types of mixing apparatus which may be used include pug mills, ribbon blenders, or mullers or vertical mixers, concrete mixers, and other similar types of mixing equipment or processes, so long as such equipment processes are sufficient to facilitate intimate contact between the reactant materials and the water medium in which such materials must react.

The lime and fly ash may be preblended, and waste added thereto in the same mixing apparatus subsequently, or the waste may be combined with lime and fly ash in the initial mixing stage. In any event, the degree of mixing and the mixing apparatus chosen will depend on the consistency of the waste and the desired consistency of the final product.

Some wastes show very high degrees of thixotropic properties making it very difficult to control the consistency of the final product for a given mix design. In these cases, the consistency of the final product can be controlled to some degree by the choice of mixing apparatus, residence time in the mixer, and the degree of shear which the material is exposed to. The above-mentioned parameters must be evaluated on a waste-by-waste basis due to the high degree of variability among the different types of industrial organic wastes.

In some cases, excessive mixing is detrimental to the reaction mechanism since over-mixing may coat the reactant materials with a potentially non-reactive waste film which can severely inhibit the desired chemical reactions. The ideal appearance of the final product, on a small scale basis, will be a particulate of waste completely surrounded by reactant materials or "microencapsulated."

The proportions of materials are selected in each case so as to permit the lime and the fly ash to react at atmospheric conditions together with sufficient water to facilitate the reaction and the formation of a cementitious matrix therefrom. In some cases, a portion of the reactant material may be provided by the waste stream, such streams commonly including water and calcium hydroxide or other lime-type components, and sometimes also including fly ash or other reactive calcium siliceous materials such as diatomaceous earth.

The water content of the final mix must be sufficient:

1. to provide enough water for the cementitious reaction to proceed, i.e., for the ionic reactants to have access to one another;

2. to provide water sufficient to permit compaction of the dry mix; and 3. yet not be such an excessive amount that the reactant materials are too dilute and the potentially cementitious products cannot mechanically interlock with one another as they are formed.

While water may be added to the lime-fly ash waste mixture in some cases, quite often the water-retentive waste provides the total amount of water necessary and the proportions of dry reactants are tailored to produce a final mix of the desired water content. In most of the examples described below, all of the water present in the final mix is provided by the waste material itself.

To determine the proper amount of water in a given mix, one generally makes up a laboratory mixture, adding solids and water as necessary, to produce a final product consistency which may vary in appearance from a thick plastic material (similar to a wet clay) to a damp, granular highly compactible material (similar to a damp soil). The commercial operation which follows then attempts to match the water content found most effective in the laboratory mix and thereafter mechanically compacts the emplaced mixture to a density of at least 90% of that achieved in the laboratory compaction of the laboratory mix.

The waste mixture prior to compaction in all cases must include sufficient water to be "compactible," that is to have a consistency such that upon mechanical compression, the overall volume of mixture is decreased and its density increased.

In this manner, as is true in lime-fly ash mixes generally, the potentially cementitious reaction product of lime and fly ash are brought into close proximity so that upon hydration the cementitious compounds are mechanically interlocked. If insufficient water is present, such that the mix is at or below the point at which it is compactible, the reactants will not realize their potential level of hydration and insufficient interlocking of cementitious product will result in a hardened mixture somewhat below the potential hardness, impermeability, and leachability characteristics of a mixture which would otherwise be satisfactory.

At the other end of the compactibility range, an excess of water will cause the potentially cementitious hydrated reaction products of the lime-fly ash reaction to be too dispersed and not to interlock with one another and thus also not to be sufficiently hard and impermeable, as compared to the potential hardness, permeability, and leachability of an optimum lime-fly ash waste mixture. Near the upper end of compactibility, that is with a water content at or perhaps even marginally exceeding the upper limits of compactibility, certain manipulative processing may permit utilization of the mixture in some cases. Typically, such a mixture may be stored for a period of time so that some prereaction or drying occurs, and the mixture thereafter placed and compacted to achieve hardness, impermeability, and leachability approaching that of the optimum characteristics achievable in mixes of the present invention.

In general, a water content of 10–30% will provide the desired degree of compactibility.

Depending on the character of the fly ash and/or waste, the active lime constituent in the final product comprises from 0.5 percent to 10 percent (preferably 3–5 percent) of the total composition on a CaO equivalent dry weight basis, i.e., weight percent of the total solids mixture.

Again depending on the characteristics of the waste or on the desired consistency of the final product, the fly ash content in the final product will range from 30 percent to 90 percent (preferably 35–60 percent) of the total composition on a wet weight basis. As the ratio of reactant materials (lime and fly ash) to waste increases, the structural and environmental properties of the final product will also increase. Therefore, the desired levels of hardness, permeability, and leachability of the stabilized waste will be determinative of the proportions of reactant materials to be used in a specific application of this process.

In general, for environmentally acceptable conversion of a physically unstable waste into a usable construction material or to dispose of such waste as landfill, suitable for subsequent reclamation, typical regulatory specifications require that the stabilized product have a maximum hardness or unconfined compressive strength of about 25 psi, a maximum permeability of $1 \times 10^{-5}$ centimeters per sec. (as determined for example by Army Corps of Engineers Laboratory Soils Testing Manual EM-1110-1-1906) and significantly reduced leachability as compared to the unstabilized waste.

The following are specific laboratory-scale examples in which the present invention has been demonstrated and the hardenability, impermeability, and/or non-leaching characteristics of the stabilized products resulting therefrom have been tested.

In each case, standard laboratory methods were used to determine the organic concentration in the waste, namely a determination of total organic carbon (TOC) and oil and grease content. These tests are described in "Standard Methods for the Examination of Water and Waste Water," 14th Ed. (1975), prepared and published jointly by the American Public Health Administration (APHA), American Water Works Association (AWWA), and the Water Polution Control Federation (WPCF). Solids content was taken as weight percent of a sample remaining after drying at 100° F. for 24 hours.

Eastern bituminous fly ash, lime (differing in the various examples as indicated), and the waste were mixed together in a standard Hobart laboratory mixer and mixed for approximately 1 min. at slow speed. The concentrations and/or ratios of the various components are listed in the tables for the various examples. Great care was taken so that the batch was not over-mixed. (Over-mixing can turn the entire batch into a thixotropic mass and can also coat or smear the reactant materials (fly ash and lime) with a water resistant film which renders the fly ash and lime non-reactive.)

Following the mixing step, the batch was mechanically compacted into Proctor cyclinders using a standard compaction effort of a 5.5 lb. hammer with a 12 in. drop. The material was compacted into the cylinders in 3 equal lifts with 25 blows per lift. Each lift was scarified prior to the placement of a new lift to ensure a tight bond between lifts. This method is described in ASTM D-698-78, Section 4.2

After compaction, the cylinders were removed from their molds and placed in sealed plastic bags to prevent moisture loss. The cylinders were then placed in curing chambers where they remained untouched for the entire length of their curing period. The curing peiods were 7 days at 100° F. and/or 28 days at 73° F.

Following curing, the samples were tested for unconfined compressive strength, permeability, and leachate characteristics. Unconfined compressive strengths were run in accordance with ASTM D-2166 "Standard Test Method for Unconfined Compressive Strength of Coadhesive Soil," except that the cylinders were soaked in water for 4 hrs. prior to their compression testing. This soaking procedure was performed in water to ensure that a chemical set had taken place. If a chemical set had not taken place, the specimens would have deteriorated in the soaking tank in a very short period of time. Permeability tests were run in accordance with Army Corps of Engineers Laboratory Soils Testing Manual EM 1110-2-1906. In this test, a 9 ft. head of water was used to saturate the test specimens. Leachate analyses of the test specimens were run in accordance ith ASTM Proposed Method of Leaching of Waste Materials Method A.

As can be seen from the tables below, the test specimens generally developed unconfined compressive strength well over 25 psi, showed very good permeability, and showed a substantial reduction in leachable constituents compared to the raw waste.

EXAMPLE 1

API separator sludge is a sludge generated from wash down of petroleum refinery units, pump leakage, surface runoff, spilled lubricants, and other maintenance and housekeeping tasks. The sludge is the collected underflow of conventional waste settling basins, the design and operation of which is as specified by the American Petroleum Institute (API). The solids portion of the sludge includes sand and fine particles of earth from rainwater runoff. It is a dark brown viscous mass and has a petroleum-like odor.

The organic fraction of this sludge is primarily composed of alkanes, such as octanes, nonanes, and decanes; cycloalkanes, such as cyclooctane; alkylbenzenes, such as ethylbenzene, propylbenzene; kerosene, furnace oil, and diesel oil, aromatics (usually $C_6$ to $C_{12}$), and polynuclear aromatics.

A sludge of this type was stabilized as follows: Mix preparation, specimen compaction, specimen curing, and specimen testing were conduted as described above, except that the primary leachate procedure used in this example was the EPA-EP Toxicity Test Procedure listed in the Federal Register 40 CFR Part 261, Appendix #2. The ASTM A procedure was used only for the determination of TOC in the leachate. Specific concentrations of fly ash, lime, and waste used in the mixer are listed in Table 1 below. The resultant stabilized mix characteristics are also listed in Table 1.

TABLE 1

| API Separator Sludge | | | | |
| --- | --- | --- | --- | --- |
| Mix No. | Fly Ash/ Waste Ratio (WWB) | Lime Content (% DWB) | Unconfined Compressive Strength (psi) 7 days @ 100° F. | Coefficient of Permeability (cm/sec) |
| 1 | 2.0/1 | 4.7 | 119 | $5.6 \times 10^{-8}$ |
| 2 | 3.7/1 | 4.7 | 57 | Not Run |

| | Raw Waste | EPA-EP Leachate of Mix 1 (ppm) | ASTM A Mix 1 (ppm) |
| --- | --- | --- | --- |
| Solids | 60% | — | — |
| TOC | 39.3% | — | 15.6 |
| Phenol | 49.6 mg/kg | 0.152 | — |
| Oil/Grease | 11.21% | 1.4 | — |

EXAMPLE 2

An acrylic emulsion waste, generated by the wash down of manufacturing equipment used in the production of acrylic resins and emulsions, comprises a suspension of certain acrylic (acrylate) resins in water.

An emulsion of this type was stabilized as follows: Mix preparation, specimen compaction, specimen curing, and specimen testing were conducted as described above. High calcium quicklime was used in all the mixes. Exact concentrations of fly ash, lime, and waste are listed, as well as resultant stabilized mix properties, in Table 2 below.

TABLE 2

| Acrylic Emulsion Waste | | | | |
| --- | --- | --- | --- | --- |
| Mix No. | Fly Ash/ Waste Ratio (WWB) | Lime Content (% DWB) | Unconfined Compressive Strength (psi) 7 days @ 100° F. | Coefficient of Permeability (cm/sec) |
| 1 | 6/1 | 4.7 | 55 | $6.3 \times 10^{-7}$ |
| 2 | 9/1 | 4.8 | 64 | Not Tested |

| | Raw Waste | ASTM A Leachate (ppm) |
| --- | --- | --- |
| TOC | 22.8% | 26 |
| Solids | 45% | — |

EXAMPLE 3

Samples of watery waste including demilitarized nerve gas and obsolete chlorinated pesticides decommissioned by the U.S. Army were treated as described herein. Information supplied on the waste characteristics indicated that it contained, among other things, aldrin, isodrin, dieldrin, endrin, diisopropylmethylphosphonate, dimethylmethylphosphonate, p-chlorophenylmethylsulfoxide, p-chlorophenylmethylsulfone.

No further information was available on the production or decommissioning procedures for this waste.

Mix preparation, specimen compaction, specimen curing, and specimen testing were conducted as described above. High calcium quicklime was used in the mixes. The specific concentrations of fly ash, lime, and waste used in the various mixes, as well as the characteristics of the stabilized waste is listed in Table 3 below.

TABLE 3

Demilitarized Nerve Gas and Pesticides

| Mix No. | Fly Ash/ Waste Ratio (WWB) | Lime Content (% DWB) | Unconfined Compressive Strength (psi) 7 days @ 100° F. | Unconfined Compressive Strength (psi) 28 days @ 73° F. | Coefficient of Permeability (cm/sec) |
|---|---|---|---|---|---|
| 1 | 3.7/1 | 4.6 | 43 | 45 | $1 \times 10^{-6}$ |
| 2 | 3.7/1 | 4.1 | 34 | — | — |

| | Raw Waste | ASTM A Leachate - Mix 1 (ppm) |
|---|---|---|
| Solids Content | 58.9% | — |
| TOC | 15.2 to 30.0% | 1260 |

EXAMPLE 4

Coking tar is the by-product from the water quenching of gaseous volatiles during the destructive distillation of coal (coking). During this operation, coal is heated in the absence of air, driving off volatiles at 600°–700° C. This hot gas stream is then shock cooled with a water spray and the resulting condensate collected in a settling tank. It is a black viscous, tacky material.

Typically, coking tar is composed, among other things, of benzene, toluene, xylenes, cumenes, coumarone, indene naphthalene, acenophthene, methylnaphthalenes, fluorene, phenol, cresols, pyridine, picolines, anthracene, carbozole, quinolines, phenanthrene.

A sample of coking tar was also stabilized in accordance therewith.

Mix preparation, specimen compaction, specimen curing, and specimen testing were conducted as described above. High calcium quicklime was used in the mix, and the EPA-EP extraction procedure was used to evaluate the leachate of the stabilized mix. Specific concentrations of fly ash, lime, and waste mix in the stabilization mix and the resulting stabilized mix characteristics are listed in Table 4 below.

TABLE 4

Coal Tar Waste

| Mix No. | Fly Ash/ Waste Ratio (WWB) | Lime Content (% DWB) | Unconfined Compressive Strength (psi) | Coefficient of Permeability (cm/sec) |
|---|---|---|---|---|
| 1 | 1/1 | 5.0 | 77 psi | $3.7 \times 10^{-7}$ |

| | Raw Waste | EPA-EP Extraction (ppm) |
|---|---|---|
| Solids Content | 67.0% | — |
| Oil & Grease | 5.2% | 18.0 |
| TOC | 17.6% | 1.7 |

While this invention has been described with reference to specific embodiments thereof, it is not limited thereto. Instead, the claims which follow are intended to be construed to encompass such other forms and embodiments and such variants and modifications thereof as may be devised by those skilled in the art without departing from the true spirit and scope of the present invention.

We claim:

1. A method of disposing of a physically unstable, water-containing, non-biologic organic waste material, said waste material being comprised of at least 20% by weight on a wet weight basis non-biologic, water insoluble, organic compounds said method consisting essentially of mixing said waste material with cementitious reactants in the presence of water, said cementitious reactants consisting essentially of lime and fly ash, to form a compactible mixture in which the relative proportions of said waste material, lime fly ash, and water are sufficient to permit said lime and fly ash to react at atmospheric conditions to form a cementitious matrix in which the nonaqueous portion of said waste material is encapsulated and permitting said mixture to react under atmospheric conditions to form a relatively impermeable, load-bearing material, wherein said mixture comprises at least 0.5% (by weight on a dry basis) CaO equivalents, and at least 30% (by weight on a wet weight basis) fly ash.

2. A method, as recited in claim 1, wherein said mixture at least 35% (by weight on a wet weight basis) fly ash, and said method further includes depositing said mixture over an area to be covered thereby and compacting it prior to permitting said mixture to react.

3. A method, as recited in claim 2, wherein said waste is coking tar.

4. A method as recited in claim 2, wherein said waste is API separator sludge.

5. A method, as recited in claim 2, wherein said waste is a pesticide residue emulsion.

6. A method, as recited in claim 2, wherein said waste is a decommissioned nerve gas emulsion.

7. A method, as recited in claim 2, wherein said waste is an acrylic manufacturing by-product waste emulsion.

8. A method, as recited in claim 2, wherein said waste is a latex manufacturing by-product waste emulsion.

9. A method, as recited in claim 2, wherein said waste includes 20–50% water insoluble, non-biologic organic compounds, and said mixture includes 30–60% fly ash (on a wet weight basis), 3–5% CaO equivalents (on a dry weight basis), and 10–30% water.

10. A method of converting a non-biological, organic waste material to a substantially impermeable, load-bearing construction material, said method consisting essentially of selecting a non-biologic, organic waste material which is substantially free of water-soluble organic compounds and comprised of at least 20% by weight (on a wet weight basis) non-biologic, water insoluble organic compounds, and combining said waste with cementitious reactants consisting essentially of lime and fly ash, in the presence of water, to form a compactible mixture in which the relative proportions of said waste material, lime, fly ash, and water are sufficient to permit said lime and fly ash to react to form a cementitious matrix in which said waste materials are encapsulated, and permitting said mixture to react under atmospheric conditions to form said impermeable, load-bearing construction material, wherein said mixture comprises at least 0.5% (by weight on a dry basis) CaO equivalents, and at least 30% (by weight on a wet weight basis) fly ash.

* * * * *